C. HOLTIN.
SAW SET.
APPLICATION FILED JAN. 30, 1911.
1,007,697.
Patented Nov. 7, 1911.
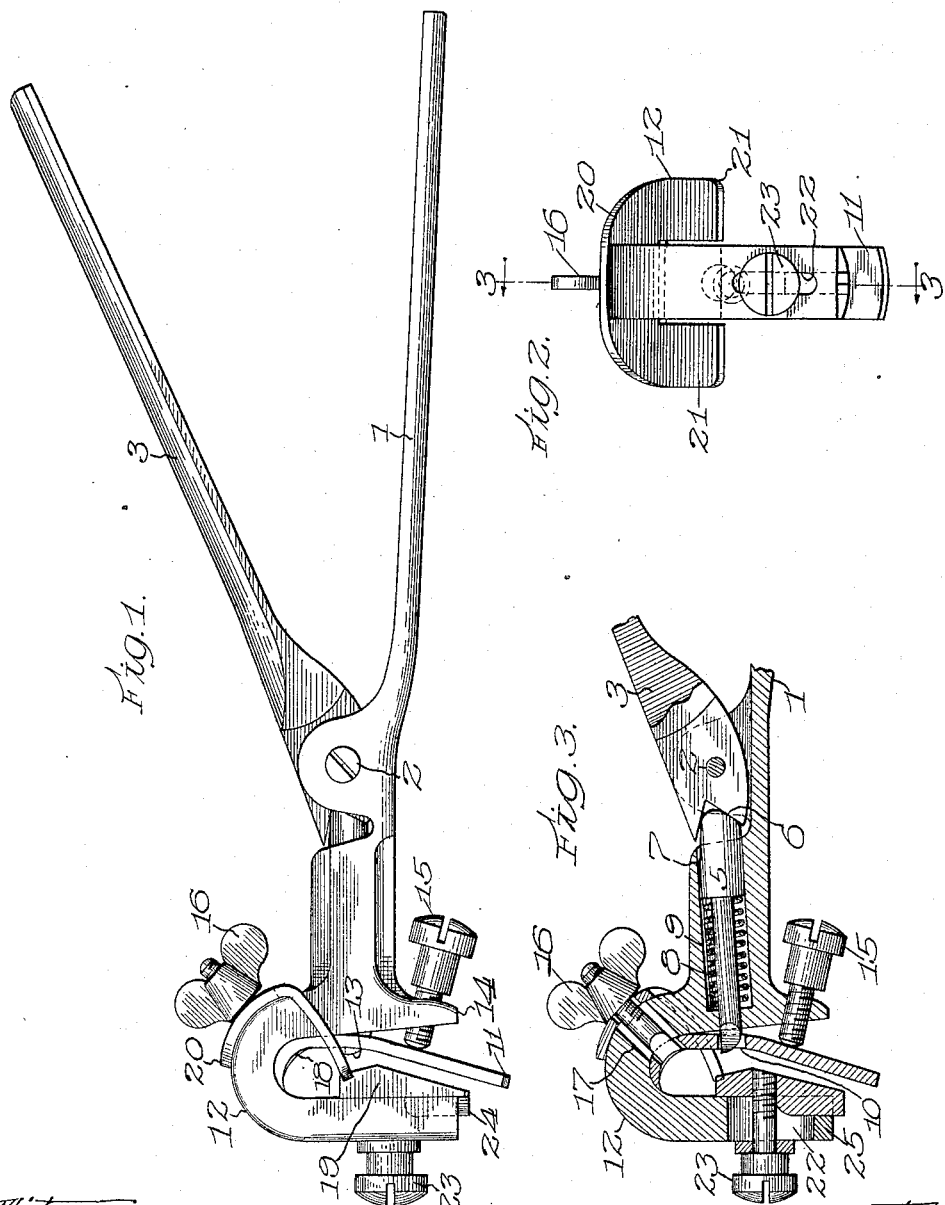

UNITED STATES PATENT OFFICE.

CARL HOLTIN, OF BROCKTON, MASSACHUSETTS.

SAW-SET.

1,007,697.

Specification of Letters Patent.

Patented Nov. 7, 1911.

Application filed January 30, 1911. Serial No. 605,620.

*To all whom it may concern:*

Be it known that I, CARL HOLTIN, a citizen of Sweden, residing at Brockton, in the county of Plymouth and State of Massachusetts, have invented certain new and useful Improvements in Saw-Sets, of which the following is a specification.

This invention relates to novel improvements in saw-sets and has for its object to greatly increase the efficiency of this type of tool.

My improvement affords means whereby a greater purchase may be had on the saw blade during the operation of setting the saw teeth thus reducing to a minimum the possibility of any slipping or relative change of position between the tool and work by which the accuracy of the setting might be impaired. Means are also provided for eliminating lateral play of the anvil.

With the foregoing and other objects in view the invention consists in the combination and arrangement of parts to be hereinafter fully described in the following specification, pointed out in the claims and illustrated in the accompanying drawings which form a part of said specification and in which—

Figure 1 is a side elevation of the tool. Fig. 2 is a front elevation. Fig. 3 is a longitudinal sectional side elevation taken on line 3—3 of Fig. 2 with a portion of the tool broken away.

Like reference characters indicate corresponding parts throughout the several views.

The numeral 1 indicates the main stock to which is journaled at 2, the lever 3 having the V-shaped nick 4 to engage the plunger 5 whose terminal face is beveled downwardly and away from the lever as at 6 and whose top and bottom faces are flattened as at 7 to conform to the bore of the main stock in which it operates and to avoid rotation of the plunger.

Part of the plunger 5 is of smaller diameter, as at 8, than the termination engaging the lever 3 and is round in cross section to permit its insertion in the spring 9 one extremity of which abuts the thicker portion of said plunger while the opposite end rests at the lower termination of the bore in the stock, the object of the spring being to return the plunger after it is driven forward by the lever. The forward end of the plunger protrudes through a small bore in the stock and through an aperture 10 in a clamp 11 situated in the head 12 of the tool and has its forward end beveled laterally to form a wedge as at 13 for contact with the individual teeth of the saw. To the lower extension 14 of the stock is fitted the set screw 15 which is arranged at a suitable angle to the horizontal center of the main stock 1 and in a plane approximately at right angles to the plane of the lower part of the clamp 11 and is adapted for engagement with that clamp.

The clamp 11 is secured within the head 12 of the tool, which head is made integral with the stock and lies normally in a vertical plane and is somewhat U-shaped in formation, by means of a thumb screw 16 operating through an aperture 17 in the head of the saw-set and through a similar though smaller aperture in the adjacent end of the clamp 11. The purpose of the clamp 11 is to press against the saw blade which comes between the same and the anvil 19. By manipulation of the set screw 15 and thumb screw 16 great pressure may be brought to bear upon the saw blade through the clamp 11.

20 is a saddle adapted through the medium of an aperture therein to be secured upon the head 12 of the tool by the thumb screw 16. The upper part of this saddle conforms to the shape of the head while the lower part is bifurcated to form legs 21 to straddle the head 12 and to normally abut the anvil 19. This saddle works in connection with the clamp 11 and obtains a purchase upon the saw blade near the teeth thereof and enables the same to be steadied against the anvil at the angle therewith desired. In operation the set screw may be withdrawn beneath the stock 1 and the position of the clamp 11 will then be such as to permit the insertion of the saw blade over the anvil with said blade lying quite or nearly in a vertical plane if desired; the legs 21 of the saddle are then placed upon the blade near the teeth thereof and the set screw 15 turned so as to force it toward the clamp 11 until the saw blade is disposed at the desired angle with the perpendicular when the screws are both tightened to hold the blade rigid, the plunger through the medium of the lever 3 is then brought forward against the saw tooth in line therewith and said tooth is given its proper set. The operation is repeated as desired.

The forward extermity of the head 12 is provided with a vertical aperture 22 through which a set screw 23 operates, the same being adapted to screw into a threaded aperture in the anvil 19, this anvil 19 being provided with a wedge-shaped rudder 24 that lies partly within the aperture 22 of the head and partly within a wedge-shaped slot 25 extending from the lower termination of said aperture to the end of the head. This arrangement prevents lateral play on the part of the anvil and affords an absolutely level working surface.

What I claim is:—

1. In a saw-set, the combination with a stock having a head, a lever pivoted to said stock, a plunger within said stock operated by said lever, a set screw carried by said stock and an anvil secured in said head, of a clamp arranged within the said head in contact with the set screw and provided with an aperture for admission of one end of the said plunger and a bifurcated saddle seated upon the said head and having its prongs astraddle thereof for engagement with the saw blade.

2. In a saw-set, the combination with a stock having a slotted head, a lever pivoted to said stock, a plunger within said stock operated by said lever, a set screw carried by said stock and an anvil secured in the said head, of a clamp disposed within the said head in contact with the set screw and provided with an aperture for admission of one end of the said plunger, a thumb screw arranged on the stock-head and engaging the said clamp through the medium of the slot in the said stock-head and a bifurcated saddle secured by the thumb screw upon said head and having its prongs astraddle thereof for engagement with the saw blade.

In testimony that I claim the foregoing as my own I have hereto affixed my signature in the presence of two subscribing witnesses.

CARL HOLTIN.

Witnesses:
CARL A. ELVER,
JULIUS FLORIN.

---

Copies of this patent may be obtained for five cents each, by addressing the "Commissioner of Patents, Washington, D. C."